United States Patent [19]

Leary

[11] Patent Number: 4,529,866
[45] Date of Patent: Jul. 16, 1985

[54] METHOD AND APPARATUS FOR ELECTRICALLY HEATING DIESEL FUEL

[75] Inventor: David F. Leary, Woodside, Calif.

[73] Assignee: Raychem Corporation, Menlo Park, Calif.

[21] Appl. No.: 474,390

[22] Filed: Mar. 11, 1983

[51] Int. Cl.³ .............. F02M 31/12; F24H 1/10; H05B 3/14
[52] U.S. Cl. .................. 219/205; 123/549; 123/557; 210/184; 210/186; 219/299; 219/305; 219/307; 219/308; 219/319; 219/338; 219/505; 219/548; 338/22 R; 431/208
[58] Field of Search ............... 219/296-299, 219/301-309, 338, 528, 548, 549, 504, 505, 319; 210/184, 182, 185, 186; 123/549, 557; 431/208; 338/22 R

[56] References Cited

U.S. PATENT DOCUMENTS

| | | |
|---|---|---|
| 1,571,379 | 2/1926 | Sharpe .................. 219/307 |
| 1,746,522 | 2/1930 | Carleton ................ 219/307 |
| 1,998,073 | 4/1935 | Carleton .............. 219/305 X |
| 2,669,299 | 2/1954 | Roach . |
| 2,800,565 | 7/1957 | Griffim et al. .......... 219/338 X |
| 3,099,737 | 7/1963 | Naxon .................... 219/307 |
| 3,564,199 | 2/1971 | Blaha ..................... 219/311 |
| 3,935,901 | 2/1976 | Virgil ...................... 165/52 |
| 3,989,019 | 11/1976 | Brandt et al. . |
| 4,072,848 | 2/1978 | Johnson et al. ........ 219/505 X |
| 4,091,265 | 5/1978 | Richards et al. ......... 219/501 |
| 4,146,475 | 3/1979 | Forsland ............... 210/184 X |
| 4,242,573 | 12/1980 | Batliwalla ............. 219/504 X |
| 4,369,110 | 1/1983 | Picek .................... 210/184 X |
| 4,372,279 | 2/1983 | Parks ................... 219/306 X |
| 4,387,691 | 6/1983 | Marcoux et al. ........ 219/205 X |
| 4,398,084 | 8/1983 | Walty ................... 219/528 X |

FOREIGN PATENT DOCUMENTS

| | | | |
|---|---|---|---|
| 2845520 | 5/1980 | Fed. Rep. of Germany ...... 219/296 |
| 310322 | 8/1933 | Italy ................... 219/303 |
| 101971 | 11/1923 | Switzerland ............ 219/299 |
| 134546 | 10/1929 | Switzerland ............ 219/301 |
| 254028 | 7/1926 | United Kingdom . |
| 539178 | 8/1941 | United Kingdom . |
| 577118 | 5/1946 | United Kingdom . |
| 1086626 | 10/1967 | United Kingdom . |
| 1095018 | 12/1967 | United Kingdom . |
| 2109516 | 6/1983 | United Kingdom . |

Primary Examiner—A. Bartis
Attorney, Agent, or Firm—Stephen C. Kaufman; Timothy Richardson; Herbert G. Burkard

[57] ABSTRACT

A method for heating diesel prior to filtration by passing the diesel fuel through a heating apparatus including a container having entry and exit ports for the fuel and an elongated electrical heater arranged in spaced apart coils within the container for directing the flow of fuel so that, as the fuel flows from the entry port to the exit port, it flows along an elongate curved path which follows the coils of the heater and which curved path preferably has a length at least eight times the straight-line distance between the entry and exit ports. The electric heater is unjacketed and comprises a pair of elongate electrodes embedded in an elongate strip of a conductive polymer composition which exhibits PTC behavior. The exterior surface of the elongate polymer strip is exposed so that it is directly contacted by the diesel fuel flowing through the container.

9 Claims, 4 Drawing Figures

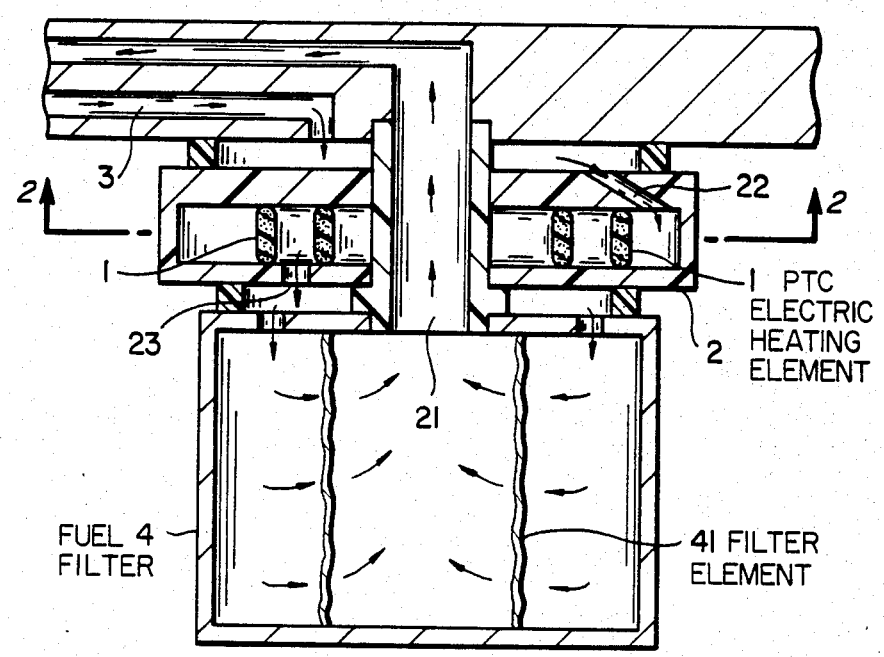
FIG_1
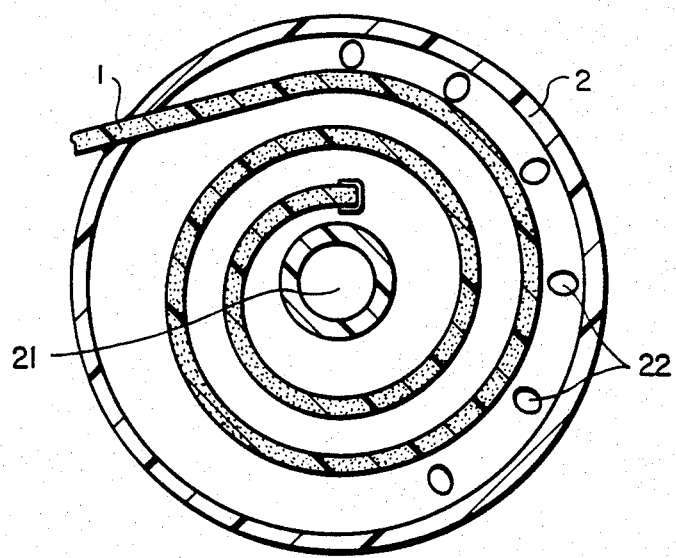
FIG_2

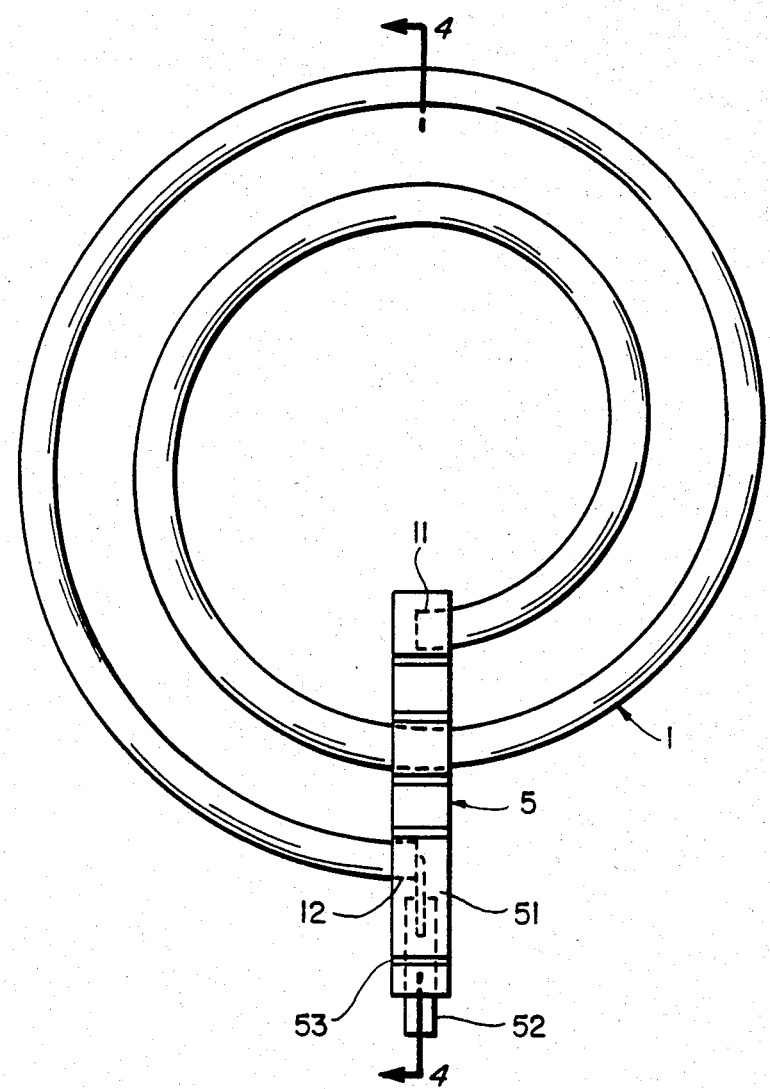
FIG_3
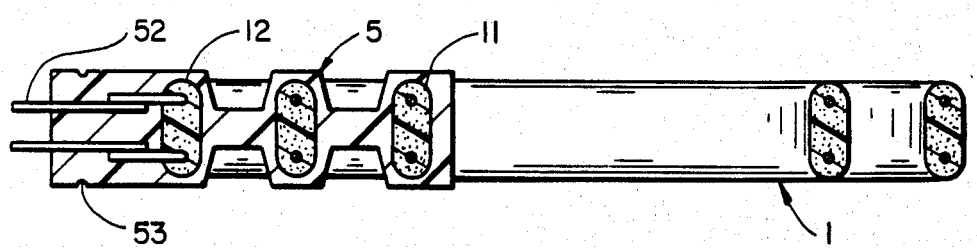
FIG_4

METHOD AND APPARATUS FOR ELECTRICALLY HEATING DIESEL FUEL

BACKGROUND OF THE INVENTION

1. Field of the Invention

This invention relates to the heating of liquids, particularly diesel fuel, by elongate electrical heaters.

2. Introduction to the Invention

If diesel fuel becomes too cold, higher molecular weight hydrocarbons therein can solidify, causing "clouding" of the fuel. These solids can block the pores of a fuel filter through which the fuel is pumped, causing the engine to lose power (or stop) or preventing the engine from starting. In order to prevent this, various methods have been proposed for heating diesel fuel before it reaches the filter. For disclosure of such methods, and other methods of heating liquids, reference may be made for example to U.S. Pat. Nos. 2,669,299, 3,564,199, 3,935,901, 3,989,019, 4,091,265 and 4,372,279 and copending and commonly assigned U.S. patent application Ser. Nos. 273,525 filed June 15, 1981, now U.S. Pat. No. 4,398,084, 382,259 filed June 15, 1981, now abandoned and 423,589 filed Sept. 27, 1982. The disclosure of each of these patents and patent applications is incorporated herein by reference.

SUMMARY OF THE INVENTION

I have now discovered that substantially improved results can be obtained by making use of an elongate electrical heater which is arranged in spaced-apart coils and which directs the flow of the liquid to be heated along the coils of the heater.

In one aspect, the invention provides apparatus for heating a liquid which comprises (1) a container having entry and exit ports for passing a liquid through the container, (2) an elongate electrical heater which is arranged in spaced-apart coils within the container to direct the flow of liquid entering the entry port so that, as the liquid passes from the entry port to the exit port, it flows along an elongate curved path which follows the coils of the heater; and (3) means for connecting the heater to a source of electrical power.

In another aspect, the invention provides a method in which a liquid is heated by passing it through apparatus as defined above while the heater is connected to a power source.

In another aspect, the invention provides a heater assembly which is adapted for installation in a suitable container to provide apparatus as defined above and which comprises (1) a support member;

(2) an elongate electrical heater which is maintained in spaced-apart coils by the support member; and (3) means for connecting the heater to a source of electrical power.

BRIEF DESCRIPTION OF THE DRAWING

The invention is diagrammatically illustrated in the accompanying drawings, in which FIG. 1 is a cross-section through apparatus of the invention installed above a fuel filter;

FIG. 2 is a cross-section along the line 2—2 of FIG. 1;

FIG. 3 is a plan view of an assembly of the invention; and

FIG. 4 is a cross-section along line 4—4 of FIG. 3.

DETAILED DESCRIPTION OF THE INVENTION

The invention is particularly useful for, and will chiefly be described by reference to, the heating of diesel fuel (and in particular #2 diesel fuel) just before it passes through the fuel filter of the fuel supply system of a diesel engine fitted to a wheeled or tracked vehicle. It will be understood, however, that the invention is useful for heating diesel fuels in other contexts and for heating other liquids, eg. other fuels, particular liquids which are electrical insulators (so that a failure of insulation between the liquid and the current-carrying components of the heater does not result in leakage currents).

Self-regulating heaters are preferred for use in this invention, especially such heaters comprising an element composed of a conductive polymer composition which exhibits PTC behavior and which may be cross-linked, for example a continuous elongate element having a pair of elongate electrodes embedded therein. Elongate heaters conventionally have an outer jacket composed an electrically insulating polymeric composition, and when such heaters are used, the liquid preferably contacts the outer jacket. However, when the liquid is a dielectric, it can make direct contact with electrically conductive parts of the heater, providing of course that such contact does not result in unacceptable damage (for example, it remains highly desirable that the ends of the heater be sealed, so that the diesel fuel cannot penetrate between the electrodes and the conductive polymer). Such direct contact improves the transfer of heat to the liquid and is preferred for this reason. When using an unjacketed PTC conductive polymer heater to heat diesel fuel, it is preferred to use a cross-linked composition comprising a fluoropolymer, particular a polymer of vinylidene fluoride.

The heater can be arranged within the container in any way which results in the desired flow pattern, but it is usually convenient for the container to comprise first and second parallel walls, with the heater sandwiched between the walls with the coils thereof lying in a plane. The heater can be arranged in a spiral coil, which is generally preferred, or in a serpentine coil with baffles within each coil to ensure the desired flow pattern. The container can contain one or more entry ports and one or more exit ports. It is preferred that the length of the elongate curved path followed by the liquid is at least 8 times, preferably at least 15 times, the straightline distance between the entry and exit ports.

Preferably, substantially all the fuel passing through the heating apparatus follows the elongate curved path adjacent the coiled heater.

The power supply used to power the heater can be of any kind appropriate to the heater, but for vehicular systems, the normal vehicle electrical supply, eg. a 12 or 24 volt DC supply, is preferably employed.

For fitting to the fuel supply system of a vehicle, the heating apparatus is preferably adapted to fit between the fuel filter and the inlet thereto. This will usually mean that the apparatus will be in the form of a flat container, for example round or square in shape, having the heater and the entry and exit ports in a peripheral portion thereof and having at its center a passageway for fuel which, having been heated in the container and having passed from the exit port(s) to the filter, is now being supplied to the engine. The passageway preferably has screw-threaded top and bottom portions for connection to the fuel system and the fuel filter.

Where a support member is used to maintain the heater in its coiled configuration, it must of course contain channels which allow the fuel to flow around the heater. The support is suitably composed of a polymeric dielectric material which is not damaged by the liquid being heated. Preferably the support contains the terminations of the heater electrodes to electrical leads or lugs suitable for connecting the heater to a power supply, and surrounds and seals the terminations. The far end of the heater can likewise be encapsulated in the support. Thus the support can be formed around the coiled heater, eg. by injection molding or by pouring a curable liquid resin, eg. an epoxy resin in a mold.

Alternatively the support comprises a chamber which contains the terminations of the heater electrodes to electrical leads or lugs suitable for connecting the heater to a power supply, and a mass of dielectric material which surrounds and seals the terminations. The far end of the heater can likewise be encapsulated in a mass of dielectric material contained within a chamber in the support.

Referring now to the drawing, FIGS. 1 and 2 show a PTC conductive polymer strip heater 1, which does not have an outer insulating jacket, arranged in the form of a spiral coil within a flat, round box 2 which has a central passageway 21. Fuel entry ports 22 are drilled in the top wall of the container so that diesel fuel which is pumped along line 3 enters the box around the outer periphery of the container and then flows in a spiral around the strip heater 1 until it reaches the fuel exit ports 23, whose position is shown in phantom in FIG. 2. The heated fuel then passes into conventional fuel filter 4, through filter element 41 and up through passageway 21 to the engine.

FIGS. 3 and 4 show an assembly of the invention comprising a PTC conductive polymer strip heater 1, which does not have an outer dielectric jacket, maintained in the form of a flat spiral coil by fixing the ends 11 and 12 of the heater in or on support member 5. Support member 5 has an end section 51 within which the connections between the conductors of the heater and spade lugs 52 are encapsulated, and which also has an O-ring groove 53 in its outer surface.

Especially when an assembly of the invention, eg. as shown in FIGS. 3 and 4, is used, the container in which it is mounted can be an integral part of the fuel filter mount or a separate container which is secured to the fuel filter mount. The interior surface of the container can be shaped, or provided with deformable portions, so that there is no more than a small gap between the heater and the container walls, in order to ensure that a sufficient proportion of the liquid follows the desired elongate path.

I claim:

1. A method of heating diesel fuel just before it passes through a filter, which method comprises passing the diesel fuel through heating apparatus comprising
   (1) a container having entry and exit ports for the diesel fuel,
   (2) an elongate electrical heater which is arranged in spaced-apart coils within the container, the heater being an unjacketed self-regulating heater which comprises a pair of elongate electrodes embedded in an elongate strip of a conductive polymer composition which exhibits PTC behavior, the exterior surface of the elongate strip being exposed so that it is directly contacted by diesel fuel passing through the apparatus; and
   (3) a source of electrical power to which the heater is connected;
   the heater directing the flow of the diesel fuel so that, as the diesel fuel flows from the entry port to the exit port, it flows along an elongate curved path which follows the coils of the heater.

2. A method according to claim 1 wherein the conductive polymer composition is a cross-linked conductive polymer composition which comprises a fluorinated polymer.

3. A method according to claim 1 wherein the length of the elongate curved path is at least 8 times the straightline distance between the entry and exit ports.

4. A method according to claim 1 wherein the container comprises first and second walls which are substantially parallel to each other and the heater is arranged in a spiral coil sandwiched between the first and second walls with the coils thereof lying in a plane.

5. Apparatus for heating diesel fuel which comprises
   (1) a container having entry and exit ports for passing the diesel fuel through the container,
   (2) an elongate electrical heater which is arranged in spaced-apart coils within the container to direct the flow of diesel fuel entering the entry port so that, as the diesel fuel passes from the entry port to the exit port, it flows along an elongate curved path which follows the coils of the heater; said heater being an unjacketed self-regulating heater which comprises a pair of elongate electrodes embedded in an elongate strip of a conductive polymer composition which exhibits PTC behavior, the exterior surface of the elongate strip being exposed so that it is adapted to be directly contacted by diesel fuel passing through the apparatus; and
   (3) means for connecting the heater to a source of electrical power.

6. Apparatus according to claim 5 wherein the length of said elongate curved path is at least 15 times the straightline distance between the entry and exit ports.

7. Apparatus according to claim 5 wherein the container comprises first and second walls which are substantially parallel to each other, and the heater is arranged in a spiral coil sandwiched between the first and second walls with the coils thereof lying in a plane.

8. A heater assembly which is suitable for installation in a container to form apparatus for heating diesel fuel passing through the container, the assembly comprising
   (1) a support member;
   (2) an elongate electrical heater which is maintained in spaced-apart coils by the support member; said heater being an unjacketed self-regulating heater which comprises a pair of elongate electrodes embedded in an elongate strip of a conductive polymer composition which exhibits PTC behavior, the exterior surface of the elongate strip being exposed so that it is adapted to be directly contacted by diesel fuel passing through the apparatus; and
   (3) means for connecting the heater to a source of electrical power.

9. An assembly according to claim 8 wherein the means for connecting the heater to a power source comprise electrical leads which are connected to the elongate electrodes by first and second connection means, and which further comprises
   (4) encapsulation means comprising a mass of electrically insulating material which provides liquid-tight encapsulation around the first and second connection means.

* * * * *